United States Patent [19]

Mueller et al.

[11] Patent Number: 4,906,682

[45] Date of Patent: Mar. 6, 1990

[54] ETHYLENE-VINYL ESTER COPOLYMER EMULSIONS

[75] Inventors: Michael Mueller, Alsbach-Haehnlein; Horst Pennewiss, Darmstadt; Juergen Gebhardt, Schaafheim, all of Fed. Rep. of Germany

[73] Assignee: Röhm GmbH, Darmstadt, Fed. Rep. of Germany

[21] Appl. No.: 241,773

[22] Filed: Sep. 7, 1988

Related U.S. Application Data

[63] Continuation of Ser. No. 28,908, Mar. 23, 1987, abandoned.

[30] Foreign Application Priority Data

Apr. 19, 1986 [DE] Fed. Rep. of Germany ....... 3613247

[51] Int. Cl.$^4$ .............................................. C08K 53/00
[52] U.S. Cl. .................... 524/505; 524/458; 524/504; 524/523; 524/524
[58] Field of Search ............... 524/458, 504, 505, 523, 524/524

[56] References Cited

U.S. PATENT DOCUMENTS

| | | | |
|---|---|---|---|
| 3,048,479 | 8/1962 | Ilnyckyj et al. | 44/70 |
| 3,382,055 | 5/1968 | Jaconson et al. | 44/62 |
| 3,567,639 | 3/1971 | Aaron et al. | 252/56 |
| 3,669,189 | 6/1972 | Fischer | 166/279 |
| 3,776,247 | 12/1973 | Choufoer et al. | 137/13 |
| 3,904,385 | 9/1975 | Sweeney | 44/62 |
| 3,951,929 | 4/1976 | Sweeney | 526/328 |
| 4,290,925 | 8/1981 | Pennewiss et al. | 252/56 |
| 4,404,000 | 9/1983 | Toyoshima et al. | 44/62 |
| 4,476,270 | 9/1984 | Brasen et al. | 524/364 |
| 4,608,411 | 8/1986 | Meunier et al. | 524/533 |

FOREIGN PATENT DOCUMENTS

| | | |
|---|---|---|
| 2056700 | 6/1971 | Fed. Rep. of Germany . |
| 1770695 | 11/1971 | Fed. Rep. of Germany . |
| 2048308 | 4/1972 | Fed. Rep. of Germany . |
| 2149588 | 3/1973 | France . |
| 1473155 | 5/1977 | United Kingdom . |
| 0193272 | 9/1986 | United Kingdom . |

OTHER PUBLICATIONS

Chem. Abstr. 101, 133833z, (Japanese Patent Application 53593/84).
Motor Oils and Engine Lubrication, Carl W. Georgi, Reinhold Publishing Corporation, New York, p. 199.
Physical Chemistry of Lubricating Oils, A. Bondi, Reinhold Publishing Corporation, New York, p. 49.
Ullmanns Encyklopädie der Technischen Chemie, 4th Edition, vol. 20, Weinheim and Deerfield Beach, FL, pp. 543–545, Op. cit., p. 548.

*Primary Examiner*—Joseph L. Schofer
*Assistant Examiner*—Peter Mulcahy
*Attorney, Agent, or Firm*—Curtis, Morris & Safford

[57] ABSTRACT

Concentrated emulsions, adaptable to use as pour point improvers, of (1) copolymers of ethylene and a vinyl ester of a $C_1$–$C_{24}$-carboxylic acid and/or (2) polyalkyl(meth)acrylic acid ester polymers in a liquid carrier medium which does not dissolve said polymers, said emulsions additionally containing, as an emulsifier, a graft- or block-copolymer of the formula $$A—Y,$$

wherein A is a segment of a copolymer of ethylene and a vinyl ester of a $C_1$–$C_{24}$-carboxylic acid (corresponding to polymer P1) or of a polymer of esters of acrylic acid and/or methacrylic acid with a $C_1$–$C_{20}$-alkanol, wherein Y is at least one segment obtained by the polymerization of vinyl monomers which are predominantly esters of acrylic acid or methacrylic acid with a $C_1$–$C_{40}$-alkanol, and wherein the carrier medium is capable of dissolving segments Y; oils containing such emulsions as pour point improvers.

8 Claims, No Drawings

ETHYLENE-VINYL ESTER COPOLYMER EMULSIONS

This application is a continuation of application Ser. No. 028,908, filed Mar. 23, 1987, and now abandoned.

The present invention pertains to liquid, highly concentrated emulsions of certain copolymers in a carrier medium including an emulsifier, which emulsions are employed for improving the flow properties and the pour point of crude oil and middle distillates thereof.

STATE OF THE ART

Technology is turning increasingly to a utilization of crude oils which have comparatively poor flow properties or a high pour point. As a rule, these properties are attributable to a content of paraffins which, on the other hand, is favorably expressed by the possession, in products prepared therefrom, of a good viscosity-temperature relationship. See, for example, Ullmanns Encyklopaedie der technischen Chemie ("Encyclopedia of Technical Chemistry") 4th Edition, Volume 20, page 548, Verlag Chemie, Weinheim (1981). The obvious solution of this problem in middle distillates, namely removal of a portion of the paraffin by solvent extraction at low temperatures, considerably increases costs, particularly because of energy consumption because the solvent must be recovered and the extraction must be carried out with cooling. In addition there are difficulties with disposal of the paraffin wax. Thus, technical interest has turned instead to the search for suitable additives which will provide better flow properties and a lowering of the pour point in mineral oils.

In addition to other classes of polymers, copolymers of ethylene and vinylesters of $C_1$–$C_4$-fatty acids, usually comprising a vinyl ester content of 15 percent to 40 percent by weight, have shown to be effective flow improvers for crude oils and middle distillates (these are the so-called "EVA-copolymers"; cf. DIN 7728 T1). (See also U.S. Pat. Nos. 3,048,479; 3,567,639; and 3,669,189).

A further class of polymers, similarly well suited for this purpose, are the polyacrylic acid esters and polymethacrylic acid esters, i.e. "poly(meth)acrylic acid esters" of long chain alcohols. See German Pat. No. 1,770,695; U.S. Pat. No. 3,776,247; German Pat. No. 2,056,700; U.S. Pat. Nos. 3,904,385; and 3,951,929).

A material which improves the flow of mineral oils at low temperatures is known from Japanese patent application 53593/84 (cf. Chem. Abstr. 101, 133833z). The material is a binary or higher graft copolymer which is prepared by the grafting of at least one unsaturated compound onto an ethylene-vinyl acetate copolymer having an ethylene content of 50-90 percent by weight and an intrinsic viscosity (in benzene at 30° C.) of 0.08-0.50 dl/g. Among such polymers are inter alia, the graft copolymers of (meth)acrylic acid esters of $C_3$–$C_{21}$-alcohols, vinyl esters, styrene, and alkylated styrene derivatives.

THE OBJECT OF THE INVENTION

Technology requires fortified flow improvers which are in liquid form and of the highest possible polymer content. To be sure, one soon reaches limits which are set by solubility. Thus, only solutions of ethylene-vinyl acetate copolymers with a polymer content of at most 10-15 percent by weight are still liquid in aromatic solvents at temperatures of about 20° C. Corresponding solutions of poly(meth)acrylic acid esters of $C_{16}$–$C_{28}$-alkanols are also solid at temperatures a little below room temperatures.

German Patent Publication No. 2,048,308 flatly denies that polymers of acrylic acid esters and methacrylic acid esters of long chain alcohols have a pour point lowering effect in crude oils having a paraffin base. Indeed, if a combination of these two polymer types, for example, in some common "package" for concurrent addition is contemplated for use as a flow improver, then the well-known incompatibility of polymer types must indeed exclude such a combination for all practical purposes.

In such cases, nevertheless the possibility remains of separately dosing both polymer types into the crude oils or middle distillates which are to be treated.

The object of the present invention are liquid, highly concentrated emulsions of copolymers of ethylene with vinyl esters of $C_1$–$C_{24}$-carboxylic acids (EVA-copolymers) and/or poly(meth)acrylic acid esters, which emulsions remain capable of flow even at low temperatures. These represent suitable "packages" for the aforementioned polymers, since they remain capable of flow at low temperatures (e.g. temperatures down to $-30°$ C.) and can be added to the oils to be treated without further dilution. The concentrated emulsions of the present invention contain at least one copolymer of ethylene with a vinyl ester of a $C_1$–$C_{24}$-carboxylic acid (polymer P1) and/or a poly(meth)acrylic acid ester (polymer P2), a liquid carrier medium which does not dissolve polymer P1 or P2 and, additionally, as an emulsifier, a graft- or block- copolymer of the formula, $$A-Y \qquad (I)$$

wherein A is a segment of a copolymer of ethylene with a methacrylic acid with a $C_1$–$C_{40}$-alkanol, and Y is at least one segment which is formed by the polymerization of vinyl monomers which predominantly are esters of acrylic acid or methacrylic acid with a $C_1$–$C_{40}$-alkanol, and wherein the carrier medium dissolves segment Y.

Preferably, the carrier medium is so chosen that it swells polymer P1 or polymer P2 to a degree of 10-300 percent in the temperature range from 40° C. to 150° C.

Further, those emulsions are preferred in which the content of polymer P1 in the emulsion is from 10-70 percent, preferably 20-50 percent, by weight. Further, those emulsions are advantageous which have a content of the emulsifier of formula I in a range of 1-30 percent, preferably 5-15 percent, by weight. In general, segments A and Y are present in the graft- or block- copolymer of formula I in a weight ratio 1:40 to 40:1, preferably 1:20 to 1:4.

POLYMER P1

Polymer P1, which is a copolymer of ethylene with at least one vinyl ester of a saturated aliphatic $C_1$–$C_{24}$-carboxylic acid, is known in the art, e.g. see U.S. Pat. No. 3,382,055. In such polymers, different vinyl esters can concurrently be used. The polymers can in principle be prepared by bulk, emulsion, or solution polymerization. As comonomers, for example, vinyl esters of acetic acid, propionic acid, butyric acid, 2-ethylhexane carboxylic acid, pelargonic acid, and stearic acid, particularly $C_2$–$C_4$-carboxylic acids, and especially vinyl acetate, can be mentioned. In general, the vinylester content is in the range from 10-80 percent, preferably 20-45 percent, and particularly 30 percent ±5 percent by weight. The average molecular weight (determined by vapor pressure osmometry) is in the range from 1,000 to 50,000, preferably 10,000 to 25,000.

Copolymers having a vinyl ester content less than 30 percent are suitably prepared by a bulk high-pressure process.

Copolymers having from 3 to 20 molar parts of ethylene per molar part of vinyl acetate, having a molecular weight of 1,000 to 2,900, having a slight degree of branching of the ethylene chains, and prepared by free radical solution polymerization are described in German Patent Publication No. 1,914,756. The melt viscosity index, determined according to ASTM Test-Method D 1238-6 T, is between 1 and 800 g/10 minutes, particularly 20–400 g/10 minutes. Commercially available ethylene-vinyl acetate copolymers comprising 2–45 percent by weight of vinyl acetate and having a melt viscosity index of 15–100 g/10 minutes, such as are sold under the name "EVATANE 28-150", are useful in the present invention.

Polymers P1 are insoluble at room temperature in the carrier medium. They swell in the carrier medium by from 10–300 percent in the temperature range from 40° C.–50° C.

POLYMER P2

Polymer P2 is a known polyalkyl(meth)acrylate having flow improving and pour point improving properties. It is obtained by the free radical polymerization of monomers of the formula

wherein $R_1$ is hydrogen or methyl and $R_2$ is linear or branched alkyl having 6–42, preferably 8–26, carbon atoms. Esters of linear $C_8$–$C_{26}$, particularly $C_{12}$–$C_{22}$-alcohols (=monomers of the formula II-A), prepared for example according to the Ziegler process by hydrolysis of aluminum alkoxides, are particularly mentioned. Typical esters are, for example, the products sold under the trade designations "LOROL" and "ALFOL", as well as the esters of linear $C_{16}$–$C_{24}$-alcohols and particularly of $C_{18}$–$C_{22}$-alcohols. The tallow alcohols and behenyl alcohols, as well as the corresponding "ALFOLS" should be mentioned. In addition, esters of (meth)acrylic acid with branched alkanols, preferably with branched $C_8$–$C_{20}$-alcohols of the isoalkanol type, particularly with isodecyl, isotridecyl, and isooctadecyl alcohols (=monomers of formula II-B) are of significance. For polymer P2 it is also true that the carrier medium will swell it to a degree of 10–300 percent in the temperature range from 40° C.–150° C.

The monomers of formula II are, as a rule, 60–100 percent by weight of polymers P2. In addition, monomers of formula II-C

wherein $R_1$ is hydrogen or methyl and $R_2'$ is alkyl having 1–5 carbon atoms, can be present in amounts of 40 percent by weight or less.

Additionally, polymer P2 may comprise other free radically polymerizable monomers having functional groups in the molecule, particularly those known to have a positive effect in oil additives, such as dispersing or detergent activity. For example, compounds of formula III

are mentioned, wherein $R_1$ is hydrogen or methyl and Bs is an (inert) heterocyclic 5- or 6- membered ring or a group

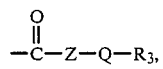

wherein Z is oxygen or $=NR_4$ and Q is a linear or branched aliphatic hydrocarbon bridge having a total of 2–10 carbon atoms, 2–6 of which preferably are linearly arranged and form the bridge per se, and $R_3$ is —OH or —$NR_5R_6$, wherein $R_5$ and $R_6$, taken alone, are each alkyl having 1 to 6 carbon atoms or, taken together with a nitrogen and possible other heteroatoms, form a heterocyclic 5- or 6- membered ring, and wherein $R_4$ is hydrogen or alkyl having 1–6 carbon atoms. The amount of this free radically polymerizable monomer having functional groups is, as a rule, in the range from 0–20 percent, preferably 2–15 percent, by weight of the polymer P2. Typical monomers are, for example, C- and N-vinylpyridine, -vinylpyrrolidone, -vinylcarbazole, and -vinylimidazole, as well as the alkyl derivatives of these compounds, particularly the N-vinyl compounds. Additional monomers are the dialkylaminoalkylesters and the hydroxyalkylesters of (meth)acrylic acid, especially dimethylaminoethyl-acrylate and -methacrylate, dimethylaminopropyl-acrylate and -methacrylate, as well as the corresponding amides, i.e. dialkylaminoalkyl-acrylamides and -methacrylamides such as dimethylaminopropyl(meth)acrylamide.

The weight average molecular weights of the polymer P2 are generally in the range from 10,000 to 1,500,000, as determined by gel permeation chromatography.

The preparation of polymers P2 can be carried out according to the usual free radical polymerization processes. Reference is made to the literature earlier cited.

THE GRAFT- OR BLOCK- COPOLYMERS OF FORMULA I

These copolymers acting as emulsifiers are made up from segments A and Y.

A by definition is a copolymer of the type P1 or P2. Y is composed of free radically polymerizable vinylic monomers, preferably of monomers of the formulas II, II-C, and III, whereby the condition must be fulfilled that the segment Y per se is soluble in the carrier medium. Conventionally, the segments A and Y in the graft- or block-copolymers of formula I are in a weight ratio 1:40 to 40:1, preferably 1:20 to 1:4.

Suitably polymer P1 corresponds with the segment A used for the preparation of the graft- or block- copolymer of formula I. Composition and molecular weight and the like may be the same, i.e. identical material can be used for both purposes; however, polymer P1 can also be different from segments A.

Here, too, ethylene-vinyl acetate copolymers having a vinyl acetate content between 20 percent and 45 percent by weight, an average molecular weight in the range of 10,000–25,000, a melt viscosity index in the range 1–800 g/10 minutes, preferably 20–400 g/10 minutes, are also preferred. It is equally so that segment A is insoluble in carrier medium, but swells therein to a degree of 10–300 percent in the temperature region from 40°–150° C.

As a rule, polymers of type A are used as the starting materials which are then reacted in a known manner to obtain the block- or graft- copolymers of formula I.

As polymer segments Y, preferably such materials are used which are comprised of the same kinds of monomers present in polymer P2. For this, a composition is satisfactory which concurrently comprises two sub-groups of monomers, for example, monomers of formula II and/or formula II-C and/or formula III. As monomers of formula II, for example, those can be mentioned in which $R_2$ is branched alkyl having 8–20 carbon atoms, preferably 8–16 carbon atoms (i.e. monomers of formula II-B).

Exemplary thereof are the acrylic acid esters and particularly the methacrylic acid esters of isoalkanols having 10, 13, and 18 carbon atoms.

Representative of monomers of formula II-C are, particularly, methyl acrylate, ethyl acrylate and -methacrylate, propyl acrylate and -methacrylate, and butyl acrylate and -methacrylate. In preparing the polymers, the monomers of formulas II and II-C in the block- or graft-segments Y in general stand in a weight ratio of 100:0 to 0:100, for example 1:1.

The components of formula III are—in case they are used—generally present as a minor amount. Thus, in preparation, the monomers of formula II or II-C stand in a weight ratio of 0:1 to 2:1, particularly about 3:1, to the monomers of formula III.

Among the functionalized monomers of formula III, those are preferred in which $R_3$ is —OH, for example hydroxyethyl- and hydroxypropyl-acrylates and -methacrylates.

PREPARATION OF GRAFT- OR BLOCK- COPOLYMERS OF FORMULA I

Avantageously, one starts with finished polymers as segments A. The graft polymerization is suitably performed as a solution polymerization. For example, the ethylene-vinyl ester polymer is dissolved in a suitable solvent which is inert under the polymerization condition. Advantageously, a solvent or solvent system is used which, the graft- or block- polymer of formula I being dissolved therein, can be added directly to the carrier medium. This requires, for example, a boiling point which lies above the temperature of the polymerization process. Suitable solvents which are useful in this sense include, for example, inert carboxylic acid esters of high boiling point, particularly phthalic acid diesters such as dibutyl phthalate. These solvents are especially suitable for the grafting of monomers of formulas II and II-C. A further group of solvents which can be used are the high-boiling, and particularly the branched, alkanols. Isodecanol is mentioned, for example. These solvents are recommended, for example, in grafting methods involving monomers of formula III.

In general the copolymers of ethylene and vinyl esters of of $C_1$–$C_4$ carboxylic acids, corresponding to component A, are dissolved with heating in the solvent or solvent system. As a guiding temperature, 100±20° C. is mentioned. A free radical graft polymerization process can be carried out following the present state of the art. See, for instance, F. Houben-Weyl, 4th Edition, Volume 14/I, p. 114, Georg Thieme Verlag (1961) or Brattaert et al., Polymer Reviews, Vol. 16, Interscience (1967).

The vinyl monomers, particularly monomers of the formulas II, II-C and III, are added to the solution of component A in a stirred vessel with heating, during which advantageously a certain fraction of the monomers, preferably less than 1/5 of the total amount of monomers, is added with an initiator. Subsequently, the principal quantity of the monomers is added at the reaction temperature with additional initiator over a period of a few hours, for example 3.5 hours, under an inert gas atmosphere such as of $CO_2$ or $N_2$. Some time after addition is concluded, for example 1.5–2 hours thereafter, the mixture may optionally be diluted and additional initiator post-added. The total polymerization time for the most part is of the order of about 20 hours. Generally, cloudy viscous solutions which as a rule contain at least 30 percent by weight of polymer are obtained.

As initiators, the usual free radical initiators, in particular, peroxidic initiators, are used. Advantageously, peresters such as tert-butyl peroctoate are used. In general, the concentration of initiator is 0.2–3 percent, by weight of the monomers. Optionally, a chain transfer agent may also be employed for adjusting the desired molecular weights of segments Y, particularly the usual sulfurous transfer agents (c.f. Houben-Weyl, loc. cit.).

THE CARRIER MEDIUM

The liquid carrier medium for the concentrated polymer emulsions of the invention shall, by definition, not dissolve polymers P1 or P2 or segment A of the graft- or block- copolymer of formula I in a temperature region of 40°–150° C., but should dissolve segment Y (independently considered from A). Preferably, the carrier medium is so chosen that polymers P1 and P2 can be swollen by 10–300 percent in the temperature region from 40° C.–150° C. The degree of swelling is determined as follows: a film of polymer P1 or P2 one mm thick, two cm long, and 0.5 cm broad of a known weight is immersed in the carrier medium at a definite temperature, for example at 70° C. or 80° C. ("working-temperature") and is stored therein for 24 hours. Thereafter it is removed with pincers, carefully freed of all adhering solvent using a filter paper, and immediately weighed. The increase in weight in percent, calculated on the starting weight, is defined as a measure of the swelling ("degree of swelling"). The swelling measurement is suitably carried out at the temperature at which the concentrated polymer emulsion is prepared. According to the invention, the degree of swelling should be from 10–300% at the chosen temperature. Prerequisite for the use of this criterion is that the maximum swelling of the polymer can be obtained under the above-indicated conditions.

The solvents employed according to the invention as the liquid carrier medium should be inert and in general unobjectionable, i.e. compatible with the intended use in oils. Carrier media which fulfill the aforementioned conditions include, for example, esters, higher alcohols, and polyvalent ether-alcohols. As a rule, the molecules of the esters and alcohol serving as the carrier media comprise more than 8 carbon atoms.

Among the esters, preferred materials are phosphoric acid esters, esters of dicarboxylic acids, esters of monocarboxylic acids with diols or polyalkylene glycols, and esters of neopentylpolyols with monocarboxylic acids cf. Ullmans Encyklopaedie der technischen Chemie, 3rd Edition, Vol. 15, pp. 287-292, Urban & Schwarzenberg (1964).

Esters of dicarboxylic acids which can be used are the esters of phthalic acid, particularly the esters of phthalic acid with $C_4$-$C_8$-alcohols, among which dibutyl phthalate, dimethyl phthalate, and dioctyl phthalate can particularly be mentioned, as well as the esters of the aliphatic dicarboxylic acids, particularly esters of linear dicarboxylic acids with branched primary alcohols. Particularly preferred are the esters of sebacic, adipic, and azelaic acids, among which in particular the 2-ethylhexyl-, isooctyl-3,5,5-trimethyl-esters, as well as the esters with $C_8$-, $C_9$-, and $C_{10}$-oxoalcohols, can be mentioned.

Among the group of higher alcohols are, for example, isodecanol and, among the polyvalent ether-alcohols, diethyleneglycol. The concurrent use of a number of solvents, especially those which are chemically related, such as a number of phthalic acid esters or a number of alcohols, is suitable.

PREPARATION OF THE POLYMER EMULSION

The amount of polymer P1 or P2 in the emulsions of the invention is 10-70 percent, preferably 20-50 percent by weight. The amount of graft- or block- copolymer formula I is usually 1-30 percent, preferably 5-15 percent by weight. Advantageously, one proceeds by preparing a suitable amount of emulsifier solution containing the graft- or block-copolymer of formula I in the carrier medium and then emulsifying therein, at temperatures from 40°-15° C., polymers P1 and/or P2 using shear forces. As a guide, about the same amounts by weight of emulsifier and carrier medium can be used.

The shear forces are preferably exerted by the use of correspondingly equipped stirrers. (cf. Ullmans Encyklopaedie der technischen Chemie, 4th Edition, Vol. 2, pp. 21-23, Verlag Chemie). On a laboratory scale, sufficient shear effect can be evoked by the use, for example, of an "Inter-mig" stirring apparatus (about 200 rpm). In general, one obtains cloudy-white stable emulsions with a high polymer content. The particle size is—as a guide—in a range from 0.3-30 microns. As a rule, the emulsions of the invention are stable at room temperature over a period of at least six months.

ADVANTAGEOUS EFFECTS

The liquid, highly concentrated polymer emulsions according to the present invention are added to oils for improving their flow properties and the pour point. Among the oils which can be used are, in particular, crude oils, middle distillates, and vacuum gas oils. These materials are well known in the art and are discussed extensively in the Kirk-Othmer Encyclopedia of Chemical Technology, Third Edition, Volume 17, pp. 183 et seq., John Wiley & Sons, New York, and in Ullmanns op. cit., Fourth Edition, Volume 10, pp. 643 et seq. As there discussed, crude oil middle distillates (also characterized as light and heavy gas oils), include kerosene, diesel and jet fuels, and heating oils and are that fraction distilling after gasoline and up to about 350° C. at atmospheric pressure. The vacuum distillates (vacuum gas oils) are obtained by vacuum distilling the residue remaining after atmospheric distillation and find use as components for admixture into diesel fuels and heating oils.

In general, the total amount of polymer (P1, P2, and emulsifier AY) added to an oil is 0.005-0.5 percent by weight of the oil. Incorporation into the oil occurs by mixing and corresponding distribution.

A better understanding of the present invention and of its many advantages will be had by referring to the following specific Examples, given by way of illustration. In the Examples, EVA-copolymer = ethylene-vinyl acetate copolymer;
VA = vinylacetate;
MFI = melt viscosity index (determined by ASTM Test-Method D1238-6ST).

Particle size is determined by measuring in a phase-contrast microscope. Viscosity is determined according to ASTM-D-2983 or DIN 51366 or DIN 51566. The pour point determination is discussed in Example 8.

EXAMPLE 1

Preparation of Emulsifier AY1 63 g of EVA-copolymer (28 percent by weight VA; MFI=150) are dissolved in 540 g dibutyl phthalate at 100° C. in a 6-liter 4-necked flask equipped with a stirrer, reflux condenser, and interior thermometer. The solution is fluid at this temperature, but a gel forms on cooling. 33.5 g of isodecyl methacrylate, 33.5 g of methyl methacrylate, and 1.83 g of i-butyl peroctoate are added to the solution. A mixture of 565 g of isodecyl methacrylate, 565 g of methyl methacrylate, and 10.17 g of t-butyl peroctoate are added at 100° C. under a $CO_2$ atmosphere over a period of 3.5 hours. 1.5 hours after the conclusion of addition, the 70% solution is diluted with 1468 g of dimethyl phthalate and 928 g of dibutyl phthalate. Subsequently, 2.4 g of t-butyl peroctoate are added. The total polymerization time is 20 hours. A weakly cloudy viscous solution with a polymer content of 30 percent by weight is obtained.

Preparation of an Emulsifier According to the Invention 228 g of emulsifier AY1, 191.6 g of EVA-copolymer, and 115.2 g each of dimethyl phthalate and dibutyl phthalate are introduced into a 1-liter Witt vessel with an Inter-mig stirrer and dispersed at 80° C. under a $CO_2$ atmosphere. The dispersion time was 16 hours. A white, cloudy, stable emulsion containing 40% of polymer, corresponding to 30% of EVA-copolymer, is obtained.

| Particle size | 0.5-2 microns |
|---|---|
| Viscosity | 570 mm$^2$/s at 50° C. |
|  | 9000 mm$^2$/s at 20 ° C. |
| Pour point | −26° C. |

The carrier swells the polymer by 86 percent.

EXAMPLE 2

Preparation of Emulsifier AY2

120 g of EVA-copolymer (28 percent by weight of VA; MFI=150) are dissolved in 400 g of isodecanol at 100° C. in a 2-liter 4-necked flask equipped with stirrer, reflux condenser, and interior thermometer. 43.4 g of isodecyl methacrylate, 14.5 g of 2-hydroxyethyl methacrylate, and 1.6 g of t-butyl peroctoate are introduced into this solution. A mixture of 316.7 g of isodecyl methacrylate, 105.5 g of 2-hydroxyethyl methacrylate and 2.53 g of t-butyl peroctoate is added at 90° C. under a $CO_2$ atmosphere over a period of 3.5 hours. 2 hours after the end of addition, 0.96 g of t-butyl peroctoate is post-added. The total polymerization time is 20 hours.

A cloudy viscous solution containing 60% of polymer is obtained.

Preparation of an Emulsion 108.3 g of emulsifier AY2, 247 g of EVA-copolymer (28 percent VA; MFI=150), 193.3 g of isodecanol, and 101.4 g of diethylene glycol are combined in a 1-liter Witt vessel equipped with an Inter-mig stirrer and are dispersed by stirring for 16 hours at 70° C. A white, cloudy, stable emulsion containing 48 percent of polymer (40 percent EVA -copolymer) is formed.

| Particle size | 2–10 microns |
|---|---|
| Viscosity | 4100 mm$^2$/s at 20° C. |
| | 4500 mm$^2$/s at 40° C. |
| Pour point | less than −30° C. |

The carrier swells the polymer by 68 percent.

EXAMPLE 3

Preparation of Emulsifier AY3

As in Example 2, 100 g of EVA-copolymer (28 percent by weight of VA; MFI=150) are dissolved at 100° C. in 500 g of isodecanol. 50 g of butyl methacrylate, 16.7 g of 2-hydroxyethyl methacrylate, and 2.1 g of t-butyl peroctoate are added and, at 90° C., a mixture of 250 g of butyl methacrylate, 83.4 g of 2-hydroxyethyl methacrylate, and 3.3 g of t-butyl peroctoate is added over a period of 3.5 hours. 2 hours after conclusion of addition, 0.8 g of t-butyl peroctoate is added. The total polymerization time is 20 hours. A cloudy viscous solution containing 50% of polymer is obtained.

Preparation of an Emulsion 130.3 g of emulsifier AY3, 247 g of EVA-copolymer, 171.4 g of isodecanol, and 101.4 g of diethylene glycol are combined and dispersed at 70° C. as in Example 1. A white-cloudy emulsion containing 48 percent of polymer is obtained

| Particle size | 2–10 microns |
|---|---|
| Viscosity | 4600 mm$^2$/s at 20° C. |
| | 4700 mm$^2$/s at 40° C. |
| Pour point | −32° C. |

The carrier swells the polymer by 68 percent.

EXAMPLE 4

Preparation of Emulsifier AY4

200 g of EVA-copolymer (28% VA by weight; MFI=150) are dissolved in 1000 g of isodecanol at 100° C. in a 4-liter 4-necked vessel equipped with stirrer, reflux condenser, and interior thermometer. 99.9 g of isodecyl methacrylate, 33.4 g of 2-hydroxyethyl methacrylate, and 4.18 g of t-butylpperoctoate are added to the solution. A mixture of 500 g of isodecyl methacrylate, 166.7 g of 2-hydroxyethyl methacrylate, and 6.7 g of butyl peroctoate is added over a period of 3.5 hours at 90° C. under a CO$_2$ atmosphere. Two hours after conclusion of addition, 1.6 g of t-butyl peroctoate are post-added. The total polymerization time is 20 hours. A cloudy viscous solution containing 50% of polymer is obtained.

Preparation of an Emulsion 162.9 g of emulsifier AY4, 308.7 g of EVA-copolymer, 74.5 g of isodecanol, and 103.9 g of diethylene glycol are combined in a 1-liter Witt vessel equipped an Inter-mig stirrer and are dispersed by stirring for 16 hours at 70° C. A white-cloudy viscous emulsion containing 60% of polymer (50% of EVA-copolymer) is

| Particle size | 2–20 microns |
|---|---|
| Viscosity | 30,000 mm$^2$/s at 20° C. |
| | 23,000 mm$^2$/s at 40° C. |
| Pour point | less than −30° C. |

The carrier swells the polymer by 55 percent.

EXAMPLE 5

Preparation of Emulsion AY5

200 g of EVA-copolymer (28 percent by weight of VA; MFI=150) are dissolved at 100° C. in 1000 g of isodecanol in a 4-liter 4-necked round flask equipped with stirrer, reflux condenser and interior thermometer. 20 g of 2-hydroxyethyl methacrylate, 113.3 g of the methacrylic acid ester of a C$_{12}$–C$_{18}$-alcohol mixture, and 4.18 g of t-butyl peroctoate are added to the solution. A mixture of 566.7 g of the methacrylic acid ester of C$_{12}$–C$_{18}$-alcohol mixture, 100 g 2-hydroxyethyl methacryloate, and 6.7 g of t-butyl peroctoate is added thereto over a period of 3.5 hours under a CO$_2$ atmosphere at 90° C. Two hours after conclusion of addition, 1.6 g of t-butyl peroctoate are added. The total polymerization time is 20 hours. A cloudy viscous solution containing 50% of polymer is obtained.

Preparation of an Emulsion 130.3 g of emulsifier AY5, 247.0 g of EVA-copolymer (28% by weight of VA; MFI=150), 171.4 g of isodecanol and 101.3 g of diethylene glycol are combined in a 1-liter Witt vessel equipped with an Inter-mig stirrer and are dispersed by stirring for 16 hours at 70° C. A cloudy white, stable, viscous emulsion containing 48% of polymer (40% EVA-copolymer) is obtained.

| Particle size | 4–20 microns |
|---|---|
| Viscosity | 3900 mm$^2$/s at 40° C. |
| Pour point | −23° C. |

The carrier swells the polymer by 68 percent.

EXAMPLE 6

Preparation of Emulsifier AY6

As described in Example 5, 200 g of EVA-copolymer (28% by weight of VA; MFI=150) are dissolved in 1000 g of isodecanol at 100° C. 33.3 g of 2-dimethylaminoethyl methacrylate, 100 g of isodecyl methacrylate, and 4.18 g of t-butyl peroctoate are added and, at 90° C., a mixture of 500 g of isodecyl methacrylate, 166.7 g of 2-dimethylaminoethyl methacrylate, and 6.7 g of t-butyl peroctoate are added over a period of 3.5 hours. Two hours after conclusion of addition, 1.6 g of t-butyl peroctoate are added. The total polymerization time is 20 hours. A cloudy viscous solution containing 50% of polymer is obtained.

Preparation of an Emulsion 130.3 g of emulsifier AY6, 247.0 g of EVA (28% by weight of VA; MFI=150), 171.4 g of isodecanol, and 101.3 g of diethylene glycol are combined in a 1-liter Witt vessel equipped with an Inter-mig stirrer and are dispersed by stirring for 16 hours at 70° C. A cloudy-brown, stable, viscous emulsion containing 48% of polymer (40% of EVA-copolymer) is obtained.

| Particle size | 2-4 microns |
| --- | --- |
| Viscosity | 2500 mm²/s at 40° C. |
| Pour point | −46° C. |

The carrier swells the polymer by 68 percent.

EXAMPLE 7

Preparation of Polymer P2 (Polybehenyl Acrylate)

1020 g of behenyl acrylate ($C_{18}$–$C_{22}$-acrylate) and 180 g of xylene are warmed to 70° C. in a 2-liter 4-necked flask equipped with stirrer, interior thermometer, and reflux condenser. After degassing with dry ice, 2.04 g of dodecyl mercaptan and then 4.08 g of t-butyl perpivalate are added under a $CO_2$ atmosphere. The reaction temperature climbs to 139° C. Four hours after starting, 0.51 g of dodecyl mercaptan and 2.04 g of t-butyl perpivalate are post-added. Total polymerization time is 16 hours. By distilling off the solvent, the polymer is obtained as a brownish solid product.

| $\eta_{sp/c}$ (20° C. in xylene) | 30 ml/g |
| --- | --- |
| Mw (light scattering) | 400,000 g/mol |
| Yield | 99.5 percent |

Preparation of EVA-Polybehenyl Acrylate Emulsion 130 g of emulsifier AY4, 247 g of EVA-copolymer (28% by weight of EVA; MFE=150), 171.4 g of isodecanol, and 101.3 g of diethylene glycol are combined in a 2-liter Witt vessel equipped with an Inter-mig stirrer and are dispersed by stirring for 16 hours at 70° C. Subsequently, 130.1 g of liquid polybehenyl acrylate, warmed to 60° C., are added and are also dispersed by stirring at 60° C. for one hour. Subsequently, the batch is diluted with 98 g of isodecanol and 42.7 g of diethylene glycol. The batch is stirred to room temperature while vigorously stirring. A milky brownish emulsion containing 48% of polymer is obtained. The weight ratio of EVA-copolymer: polybehenyl acrylate is 2:1.

| Particle size | 4-25 microns |
| --- | --- |
| Viscosity | 3000 mm²/s at 20° C. |
|  | 3900 mm²/s at 40° C. |
| Pour point | −40° C. |

The carrier swells the polymer by 68 percent.

EXAMPLE 8

Preparation of an EVA Emulsion 108.3 g of emulsifier AY2, 247.0 g of EVA-copolymer (33 percent by weight of VA; MFI=400), 159.5 g of isodecanol, and 135.2 g of diethylene glycol are combined in a 1-liter Witt vessel equipped with an Inter-mig stirrer and are dispersed by stirring for 16 hours at 60° C. A cloudy-white stable emulsion containing 48 percent of polymer (40% of EVA-copolymer) is obtained

| Particle size | 2-10 microns |
| --- | --- |
| Viscosity | = 7200 mm²/s at 40° C. |
| Pour point | −44° C. |

The carrier swells the polymer by 82 percent.

The changes in pour point or cold filter plugging point of various crude oils and middle distillate oils (e.g. a diesel fuel and a vacuum gas oil) using the emulsions of the Examples are reported in the following Table.

Determination of Pour Point

Method A: A sample of the crude oil or vacuum gas oil is warmed to 60° C. At this temperature, the concentrated polymer emulsion is added and stirred in. By placing in a water bath at 25° C., the sample is cooled to 36° C. and the pour point is determined according to DIN 51597 by placing in a bath at 0° C., in any event without reheating to 46° C.

Method B: As in Method A, but the crude oil is warmed to 80° C.

Method C: As in Method A, but the crude oil is warmed to 50° C.

Method D: The polymer emulsion is added to, and stirred into, diesel fuel previously warmed to 60° C. After cooling to room temperature, the cold filter plugging point is determined according to DIN 51428.

Crude Oil I: A crude oil of German origin which has a pour point of +18° C. and contains 15 percent of n-paraffins.

Crude Oil II: A crude oil of West African origin which has a pour point of +24° C. and contains 10.6 percent of n-paraffins.

Crude Oil III: A crude oil of North Sea origin which has a pour point of +27° C. and an n-paraffin content of 14.7 percent.

Crude Oil IV: A crude oil of Baltic Sea origin having a pour point of +12° C. and containing 8.9 of n-paraffins.

Vacuum Gas Oil I: A vacuum gas oil from a Scandinavian refinery having a pour point of +39° C. and an n-alkane content of 13.3 percent.

Diesel Fuel I: From an English refinery, the fuel has a cloud point (DIN 51597) of −4° C. and a cold filter plugging point (DIN 51428) of −4° C. The content of n-paraffins is 16.3 percent.

TABLE

Effect of the Pour Point Improvers According to the Invention

|  | Method | Pour Point (untreated) (°C.) | Amount of Polymer Additive (ppm) | Pour Point (°C.) Using the Polymer Additive According To: | | | | | | | |
| --- | --- | --- | --- | --- | --- | --- | --- | --- | --- | --- | --- |
|  |  |  |  | Ex. 1 | Ex. 2 | Ex. 3 | Ex. 4 | Ex. 5 | Ex. 6 | Ex. 7 | Ex. 8 |
| Crude Oil I | A | +18 | 250 | −3 | −6 | ±0 | ±0 | −6 | −3 | −6 | — |
| Crude Oil II | A | +24 | 250 | +6 | +6 | — | +9 | +3 | +3 | +3 | — |
| Crude Oil III | B | +27 | 1000 | +3 | +9 | +12 | +12 | — | — | +9 | — |
| Crude Oil IV | C | +12 | 50 | — | −24 | — | — | −27 | −21 | — | — |
| Vacuum Gas Oil I | A | +39 | 250 | +24 | +21 | +21 | — | — | — | +24 | — |

TABLE-continued

Effect of the Pour Point Improvers According to the Invention

|  | Method | Pour Point (untreated) (°C.) | Amount of Polymer Additive (ppm) | Pour Point (°C.) Using the Polymer Additive According To: | | | | | | | |
| --- | --- | --- | --- | --- | --- | --- | --- | --- | --- | --- | --- |
|  |  |  |  | Ex. 1 | Ex. 2 | Ex. 3 | Ex. 4 | Ex. 5 | Ex. 6 | Ex. 7 | Ex. 8 |
| Diesel Fuel I | D | −4* | 500 | — | −12* | — | — | — | — | — | −16* |

*Cold Filter Plugging Point

What is claimed is:

1. A method for making a concentrated emulsion, adaptable to use as a pour point improver and comprising (1)(a) at least one copolymer of ethylene with a vinyl ester of a $C_1$–$C_{24}$-carboxylic acid (polymer P1) and (b) at least one polyalkyl (meth) acrylic acid ester polymer (polymer P2); (2) a liquid carrier medium which does not dissolve polymers P1 and P2; and, additionally, as an eumulsifer, (3) a graftor block-copolymer of the formula

AY, wherein A is a segment of a copolymer of ethylene with a vinyl ester of a $C_1$–$C_{24}$-casrboxylic acid (corresponding to polymer P1) or of a polymer of an ester of acrylic acid and/or of methacrylic acid with a $C_1$–$C_{40}$-alkanol, wherein Y is at least one segment formed by the polymerization of vinyl monomers which predominantly are esters of acrylic acid or methacrylic acid with a $C_1$–$C_{40}$-alkanol, and wherein the carrier medium is a solvent for segment Y, which method comprises dissolving said graft- or block-copolymer in said carrier medium, which swells polymers P1 and P2 to an extent of 10–300 percent, and then emulsifying polymers P1 and P2 therein at a temperature from 40° C.–150° C. using shear forces.

2. A concentrated emulsion prepared by the method of claim 1.

3. The method for reducing the pour point of a crude oil, vacuum gas oil, or middle distillate oil which comprises adding thereto an amount of a concentrated emulsion as in claim 2 as provides a total of 0.005 to 0.5 percent, by weight of said oil, of the polymers recited.

4. A crude oil, vacuum gas oil, or middle distillate oil comprising, as a pour point reducing additive, an amount of an emulsion as in claim 2 as provides a total of 0.005 to 0.5 percent, by weight of said oil, of the polymers recited.

5. A concentrated emulsion as in claim 2 wherein said carrier medium swells polymers P1 and P2 in the temperature region of 40°–150° C. to an extent of 10–300 percent.

6. A concentrated emulsion as in claim 2 wherein the amount of polymers P1 and P2 is from 10–70 percent by weight of the total emulsion.

7. A concentrated emulsion as in claim 2 wherein the amount of graft- or block- copolymer in the total emulsion is from 1–30 percent by weight.

8. A concentrated emulsion as in claim 2 wherein segments A and Y in said graft- or block- copolymer are in a weight ratio of 1:40 to 40:1.

* * * * *